United States Patent [19]
Voeller et al.

[11] Patent Number: 6,012,693
[45] Date of Patent: Jan. 11, 2000

[54] MULTI-FUNCTION DISPLAY MOUNTING SYSTEM

[75] Inventors: Donald M. Voeller, Eagan; Harry C. Sweere, Minneapolis, both of Minn.

[73] Assignee: Ergotron, Inc., St. Paul, Minn.

[21] Appl. No.: 09/026,202

[22] Filed: Feb. 19, 1998

[51] Int. Cl.[7] ................................................. E04G 3/00
[52] U.S. Cl. ................. 248/280.11; 248/918; 248/920; 248/284.1; 248/281.11; 248/279.1; 248/558
[58] Field of Search ...................... 248/280.11, 123.11, 248/281.11, 284.1, 278.1, 279.1, 918, 919, 920, 921, 922, 923, 558, 324, 325, 586, 585, 292.11

[56] References Cited

U.S. PATENT DOCUMENTS

| | | | |
|---|---|---|---|
| 2,090,439 | 8/1937 | Carwardine | 248/325 |
| 4,453,687 | 6/1984 | Sweere | 248/183.3 |
| 4,562,987 | 1/1986 | Leeds et al. | 248/278.1 |
| 4,768,744 | 9/1988 | Leeds et al. | 248/280.11 |
| 4,826,123 | 5/1989 | Hannah et al. | 248/281.11 X |
| 4,836,478 | 6/1989 | Sweere | 248/279.1 |
| 4,844,387 | 7/1989 | Sorgi et al. | 248/281.11 X |
| 4,846,434 | 7/1989 | Krogsrud | 248/284.1 |
| 5,108,063 | 4/1992 | Koerber, Sr. et al. | 248/284.1 |
| 5,123,621 | 6/1992 | Gates | 248/281.11 |
| 5,738,316 | 4/1998 | Sweere et al. | 248/123.11 |
| 5,743,503 | 4/1998 | Voeller et al. | 248/284.1 |
| 5,799,917 | 9/1998 | Li | 248/921 X |
| 5,826,846 | 10/1998 | Buccieri et al. | 248/280.11 |
| 5,842,672 | 12/1998 | Sweere et al. | 248/280.11 X |

*Primary Examiner*—Ramon O. Ramirez
*Assistant Examiner*—Stephen S. Wentsler
*Attorney, Agent, or Firm*—Hugh D. Jaeger

[57] ABSTRACT

Lift/suspension system for vertical and azimuthal support for display or use of computer monitors, keyboards or other equipment, which can be economically manufactured and assembled from common component parts for utilization in either a lift mode or a suspension mode. A gas spring provides for support of the system.

4 Claims, 8 Drawing Sheets

MULTI-FUNCTION DISPLAY MOUNTING SYSTEM

CROSS REFERENCES TO CO-PENDING APPLICATIONS

None.

BACKGROUND OF THE INVENTION

1. Field of the Invention

The present invention is for a support system for a video monitor, flat screen display, keyboard or other device, and more particularly, pertains to a lift/suspension system using common component parts which is economically manufactured and assembled for use either in a lift mode where the load is supported above the level of an arm major bracket or in a suspension mode where the load is supported below the level of an arm major bracket.

2. Description of the Prior Art

Prior art four bar linkage or other adjustable support mechanisms provided for support of computer related devices such as video monitors, keyboards and the like where the support mechanism was provided either for lifting or suspended support. Depending on which type of support was required one had to choose from different models which provided the proper method of support whether it be lifting or suspension type support. Each style support required a different and variously or completely differently configured arrangement of components, often adding cost by virtue of part inventory, storage, additional design and tooling, and other such factors.

The present invention provides for a support system, herein called the lift/suspension system, which is assembled from a common set of component parts and built either in the lift mode or in the suspension mode as desired.

SUMMARY OF THE INVENTION

The general purpose of the present invention is to provide a lift/suspension system for the support of a video monitor or related components which is assembled from a common set of component part members to provide either a lift system or a suspension system.

According to one embodiment of the present invention, there is provided a four bar linkage system having an arm major bracket, an arm lower link bracket pivotally attached at its lower end to the arm major bracket and pivotally attached at its upper end to an arm minor bracket, an arm upper link bracket pivotally attached at its lower end to the arm major bracket and pivotally attached at its upper end to the arm minor bracket, a gas spring adjustably attached to and between the arm major bracket and the arm minor bracket, and a support tube secured to the arm minor bracket for support of a tray or a swivel mount or the like.

One significant aspect and feature of the present invention is a support system which can be manufactured from common components to provide for support of a load in either lift mode or a suspension mode.

Another significant aspect and feature of the present invention is a suspension system which rotates about a vertical axis.

Another significant aspect and feature of the present invention is a support system which can be assembled in a lift mode such that a load is supported above the level of an arm major bracket or which can be assembled in a suspension mode such that a load is supported below the level of an arm major bracket.

Another significant aspect and feature of the present invention is a lift/suspension system which is economical to manufacture utilizing a commonality of component part members.

Another significant aspect and feature of the present invention is a support system possessing interchangeability of component members which enables assembly or manufacture as a support system incorporating a lift mode or a suspension mode.

Another significant aspect and feature of the present invention is a support system incorporating a gas spring adjustably secured between an arm major bracket and the upper end of a four bar linkage to provide for lifting or suspension support, depending upon the desired mode of support.

Having thus described embodiments and significant aspects and features of the present invention, it is the principal object hereof to provide a lift/suspension system utilizing common components for support of a video monitor or other related equipment which can be manufactured in the lift mode or the suspension mode.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
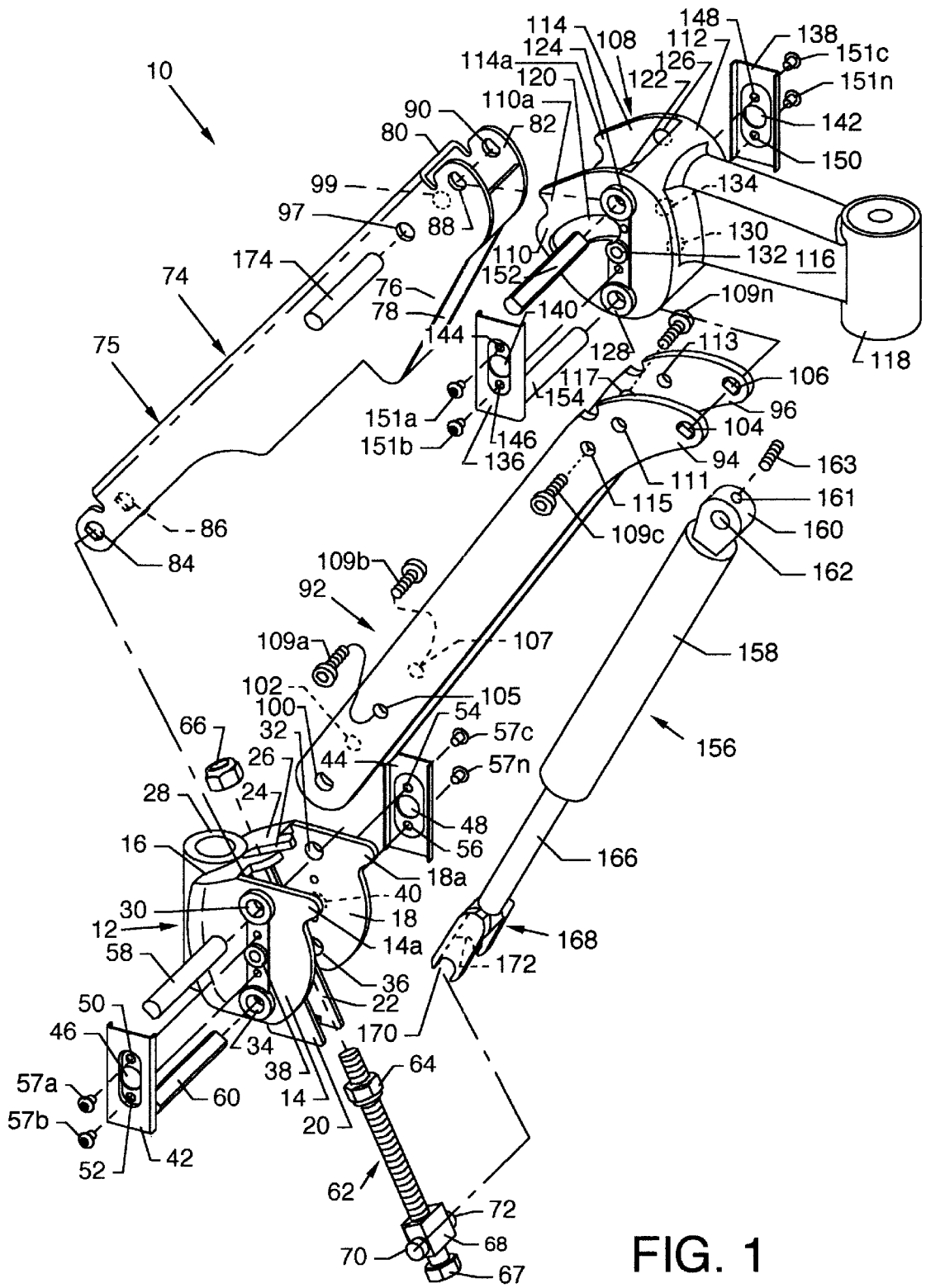
FIG. 1 illustrates an exploded view of a lift/suspension system which can be configured either in a lift mode or a suspension mode.

FIG. 1 illustrates an exploded view of a lift/suspension system 10 including an arm major bracket 12 having a vertically oriented left side 14, a back 16, a vertically oriented right side 18, two opposing substantially vertically oriented bars 20 and 22, a horizontal flange 24 with a slot 26 which is mounted between the upper region of the left side 14, back 16 and right side 18, and an integral support tube 28 located at the back 16. Support tube 28 can secure over and about a vertically oriented cylindrical mounting structure to allow the lift/suspension system 10 to be rotated about a vertical axis. The arm major bracket 12 includes opposing upper holes 30 and 32 located on the left side 14 and right side 18, respectively, and opposing lower holes 34 and 36 located on the left side 14 and right side 18, respectively, with like alignment protrusions 38 and 40 in between. Plates 42 and 44 with holes 46 and 48 align to the alignment protrusions 38 and 40 of left and right sides 14 and 18, respectively. Screw holes 50, 52, 54 and 56 accommodate a plurality of screws 57a–57n which secure into the left and right sides 14 and 18 to secure plates 42 and 44 against the ends of upper and lower rods 58 and 60 to secure the upper and lower rods 58 and 60 within the upper holes 30 and 32 and lower holes 34 and 36 of the arm major bracket 12. A hex bolt 62 with a lower nut 64 and an upper nut 66 and a hex head 67 secures into a block 68 which includes two opposing pivot projections 70 and 72. The hex bolt 62 and upper and lower nuts 66 and 64 secure in the slot 26 in flange 24. The block 68, having a configured backside shape, aligns to and is adjustable along the edges of the opposing bars 20 and 22. Adjustment of the hex head 67 positions the block 68 along the hex bolt 62 for adjustment of a gas spring tube 156 as later described in detail.

Figure 5:
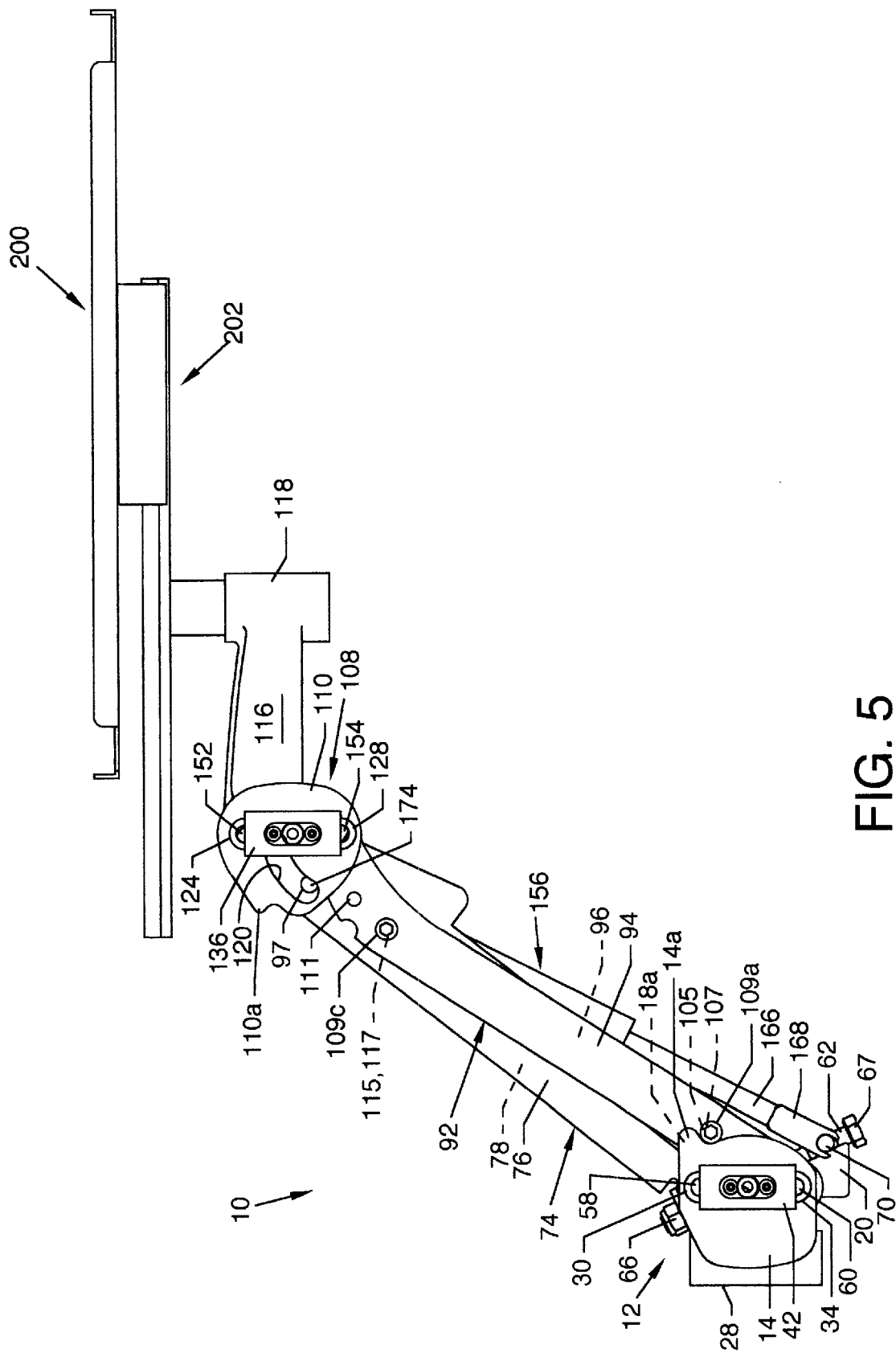
FIG. 5 illustrates a side view of the lift/suspension system configured in the lift mode where the lift/suspension system is positioned in the highest allowable position.

An arm upper link bracket 74 includes a U-shaped member 75 having opposing left and right sides 76 and 78, a back 80, and a stiffening element 82 spanning left and right sides 76 and 78. There are opposing lower holes 84 and 86 in left and right sides 76 and 78, respectively, and opposing extreme upper left and right holes 88 and 90 and upper left and right holes 97 and 99 in the left and right sides 76 and 78, respectively. An arm lower link bracket 92, which aligns over and about and parallel to the left and right sides 76 and 78 of the arm upper link bracket 74, is comprised of opposing left and right sides 94 and 96 having opposing lower holes 100 and 102 and opposing upper holes 104 and 106. Also included at the lower region of the arm lower link bracket 92 are opposing threaded holes 105 and 107 in the left and right sides 94 and 96 of the lower link bracket 92 for accommodation of cap screw stops 109a–109b which are part of a plurality of cap screw stops 109a–109n. The cap screw stops 109a and 109b, installed in holes 105 and 107, respectively, limit the upward travel of the arm lower link bracket 92 and thus the arm upper link bracket 74 upon impinging stops 14a and 18a on major bracket 12 left and right sides 14 and 18, respectively, as illustrated in FIG. 5. Either adjacent opposing upper holes pair 111 and 113 or opposing lower holes pair 115 and 117 in the upper region of the arm lower link bracket 92 can accommodate cap screw stops 109c and 109n depending on whether the lift or the suspension mode will be utilized. As described in FIGS. 7 and 8, cap screw stops 109c and 109n are installed in upper threaded holes 111 and 113 to engage arcuate slots 120 and 122 of an arm minor bracket 108, later described in detail, to limit the movement of the arm lower link bracket 92, and thus the arm upper link bracket 74, in the suspension mode of operation. The lift/suspension system 10 can be configured for operation in the lift mode as described in FIGS. 5 and 6 by installation of the cap screw stops 109c and 109n in the lower threaded holes 115 and 117. Again, cap screw stops 109c and 109n are used only in the upper threaded holes 111 and 113 for operation in the suspension mode or used only in the lower threaded holes 115 and 117 for operation in the lift mode. Gap screw stops 109a and 109b are not utilized in the suspension mode.

The arm minor bracket 108 is fashioned much the same as the arm major bracket 12 and includes a left side 110, a back 112, a right side 114, and an extension 116 for a tube 118. Left side 110 and right side 114 include stops 110a and 114a, respectively. Opposing arcuate slots 120 and 122 are located in the left and right sides 110 and 114 of the arm minor bracket 108. The arcuate slots 120 and 122 engage cap screw stops 109c and 109n which are installed in the opposing upper threaded holes 111 and 113 when the lift/suspension system 10 is utilized in the suspension mode. There are opposing upper holes 124 and 126 in the left and right sides 110 and 114, respectively, opposing lower holes 128 and 130 in the left and right sides 110 and 114, respectively, and alignment protrusions 132 and 134 located therebetween. Also included are plates 136 and 138 with holes 140 and 142 for accommodation of the alignment protrusions 132 and 134 and with screw holes 144, 146, 148 and 150 for accommodation of a plurality of screws 151a–151n. Upper and lower rods 152 and 154 align through the opposing upper holes 124 and 126 and the opposing lower holes 128 and 130, respectively, and are secured in place by plates 136 and 138 in the same manner as previously described for upper and lower rods 58 and 60. The upper rod 152 also passes through the extreme upper holes 88 and 90 in the arm upper link bracket 74 to link the upper portion of the arm upper link bracket 74 to the arm minor bracket 108. The lower rod 154 also passes through the upper holes 104 and 106 of the arm lower link bracket 92 to link the upper portion of the arm lower link bracket 92 to the arm minor bracket 108. In a similar fashion, the upper rod 58 aligns through the upper holes 30 and 32 of the arm major bracket 12 and through the lower holes 84 and 86 at the lower region of the arm upper link U-shaped bracket 74 and the lower rod 60 aligns through lower holes 34 and 36 of the arm major bracket 12 and through holes 100 and 102 at the lower region of the arm lower link bracket 92 to collectively link the arm lower link bracket 92 and the arm upper link bracket 74 to the arm major bracket 12.

All of the previously described structure forms a four bar linkage which is dependent upon a pressurized gas spring 156.

A counterbalance system is incorporated to provide for support in either the lift mode or the suspension mode. A gas spring tube 156 with a tube 158 includes a clevis 160 having a connecting hole 162 and a rod 166 with U-shaped member 168 with opposing rounded slots 170 and 172 mounted to the lower end of rod 166. The opposing rounded slots 170 and 172 of the U-shaped member 168 rotatingly engage the pivot projections 70 and 72, respectively, to mount one end of the gas spring 156 to the adjustable block 68 on the hex bolt 62. The clevis 160 of the gas spring 156 is connected via the connecting hole 162 either to a pin 174 which rotatingly secures in upper holes 97 and 99 of the arm upper link bracket 74 when the invention incorporates the lift mode, or is rotatingly secured to the upper rod 152 which extends between upper holes 124 and 126 when the invention is incorporated in the suspension mode. A threaded hole 161 in the clevis 160 accommodates a set screw 163. The set screw 163 secures against pin 174 when lift mode is used. The set screw 163 is not installed when the suspension mode is used. Outward tension of the rod 166 ensures engagement of the U-shaped member 168 with the pivot projections 70 and 72 of the block 68. Hex head 67 is adjusted to position block 68 along the edges of opposing bars 20 and 22. Positioning of block 68 adjusts the length, and thus the tension and mechanical advantage along the gas spring 156. Tensioning is adjusted in either the lift or suspension mode to provide the required amount of support for the load carried by the tube 118 at the end of the extension 116. The adjustment of the counterbalance system incorporating the hex bolt 62, block 68, and bars 20 and 22.

The edges of the vertically oriented bars 20 and 22 are angled or appropriately shaped such that the desired angle or shape is derived by mathematical algorithms to provide optimal linear lift or suspension force over the complete range of adjustment. Optimal combination of the lift mode derived adjustment path and the suspension mode derived adjustment path from algorithms are chosen to allow a utilization of the same arm upper link bracket 74, arm lower link bracket 92, and arm major bracket 12 for both lift and suspension modes.

Figure 2:
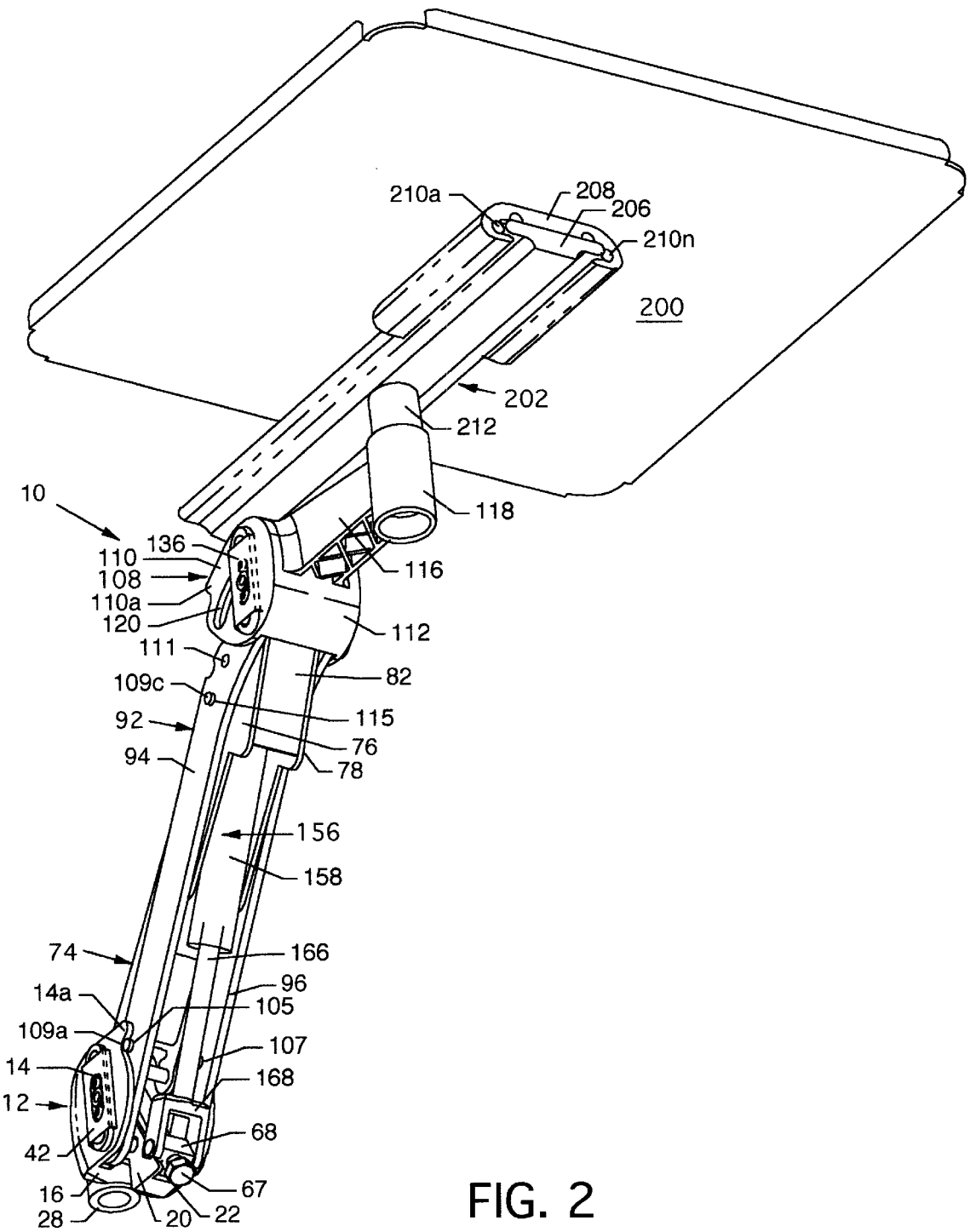
FIG. 2 illustrates a perspective view of an assembled lift/suspension system configured in the lift mode.

FIG. 2 illustrates a perspective view of an assembled lift/suspension system 10 configured in the lift mode, where all numerals correspond to those elements previously described. A tray 200 and a positionable sliding support system 202 are shown as supported by the tube 118 of the lift/suspension system 10. The lift/suspension system 10 is shown in the highest position where cap screw stops 109a and 109b (not visible) are installed in threaded holes 105 and 107 to limit the upward positioning of the lift/suspension system 10. The positionable sliding support system 202 includes a lower extrusion 206 which slidingly engages another shorter mating upper extrusion 208. A plurality of plastic rod members 210a–210n are located at the inner surfaces of the upper extrusion 208 and are exposed to offer sliding contact surfaces against which the outer surfaces of the lower extrusion slide to provide for fore and apt adjustment of the tray 200 or other attached device. A large rod 212 secures to the bottom of the lower extrusion 206. The large rod 212 rotatingly engages the tube 118 to offer pivotal adjustment of the support system 202 and tray 200 about the vertical axis of the large rod 212.

Figure 3:
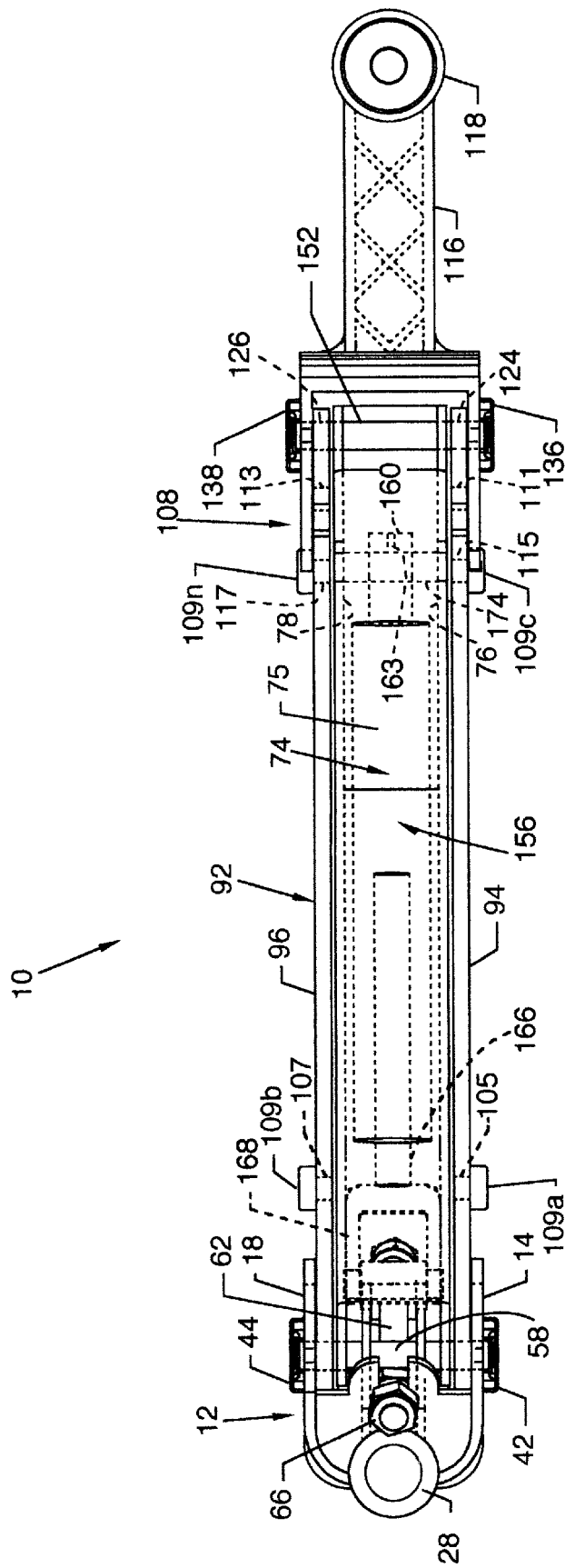
FIG. 3 illustrates a top view of the lift/suspension system configured in the lift mode.

FIG. 3 illustrates a top view of the lift/suspension system 10 configured in the lift mode where the lift/suspension system 10 has been lowered to a mid position, where all numerals correspond to those elements previously described. Especially illustrated is the alignment of the arm lower link bracket 92 over and about the arm upper link bracket 74 as well as the mounted relationship of the arm lower link bracket 92 and the arm upper link bracket 74 to the arm major bracket 12 and the arm minor bracket 108.

Figure 4:
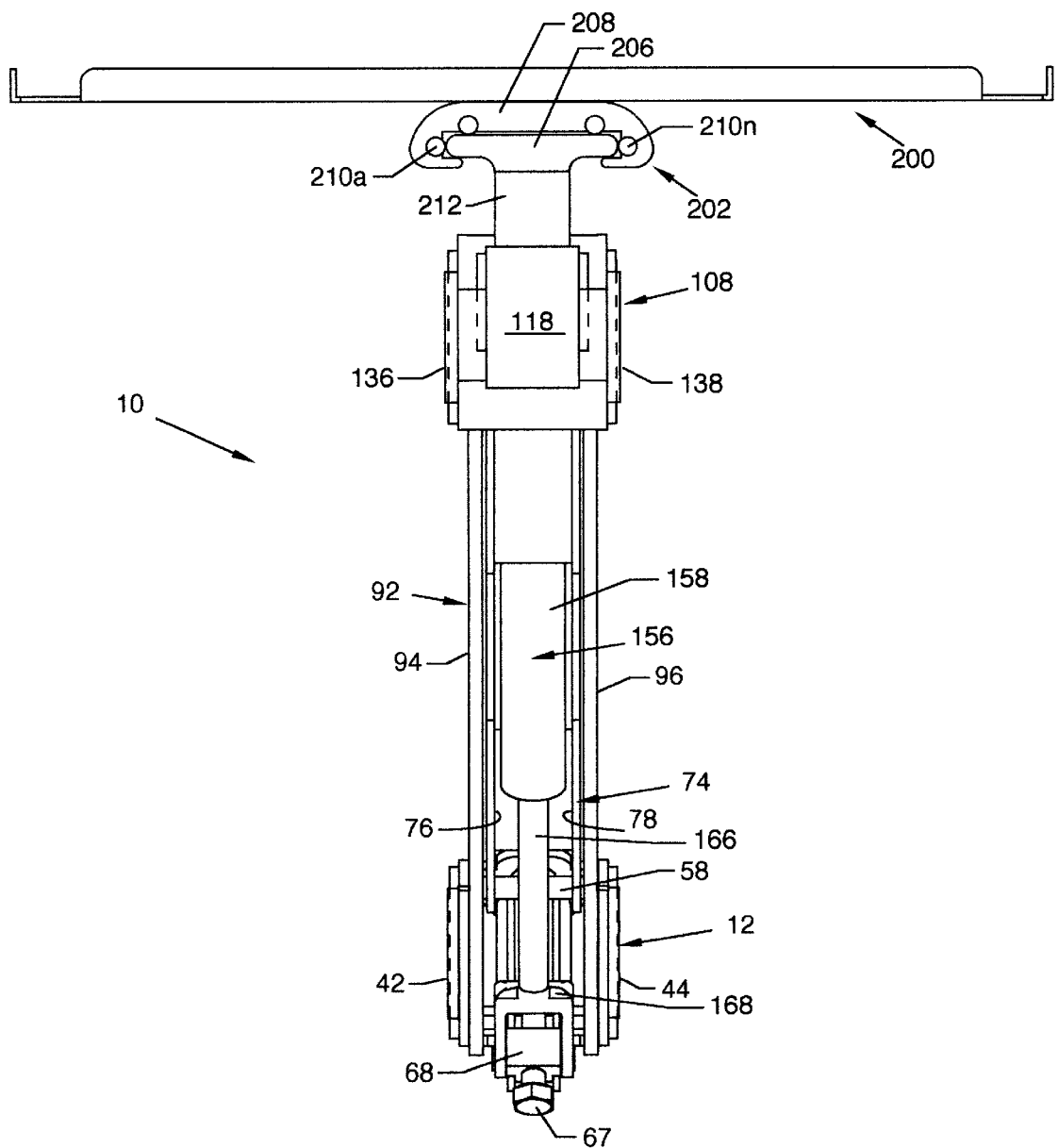
FIG. 4 illustrates a front view of the lift/suspension system configured in the lift mode where the lift/suspension system has been raised to the highest allowable position.

FIG. 4 illustrates an end view of the lift/suspension system 10 configured in the lift mode where the lift/suspension system 10 has been raised to the highest allowable position, where all numerals correspond to those elements previously described.

FIG. 5 illustrates a side view of the lift/suspension system 10 configured in the lift mode where the lift/suspension system 10 is positioned in the highest allowable position, where all numerals correspond to those elements previously described. In this position upward movement of the arm lower link bracket 92, and thus the upward movement of the arm upper link bracket 74, is limited and restricted by impingement of the cap screw stops 109a and 109b (not visible) in threaded holes 105 and 107 (not visible) with stops 14a and 18a located on left and right sides 14 and 18 of the arm lower link bracket 92, respectively.

Figure 6:
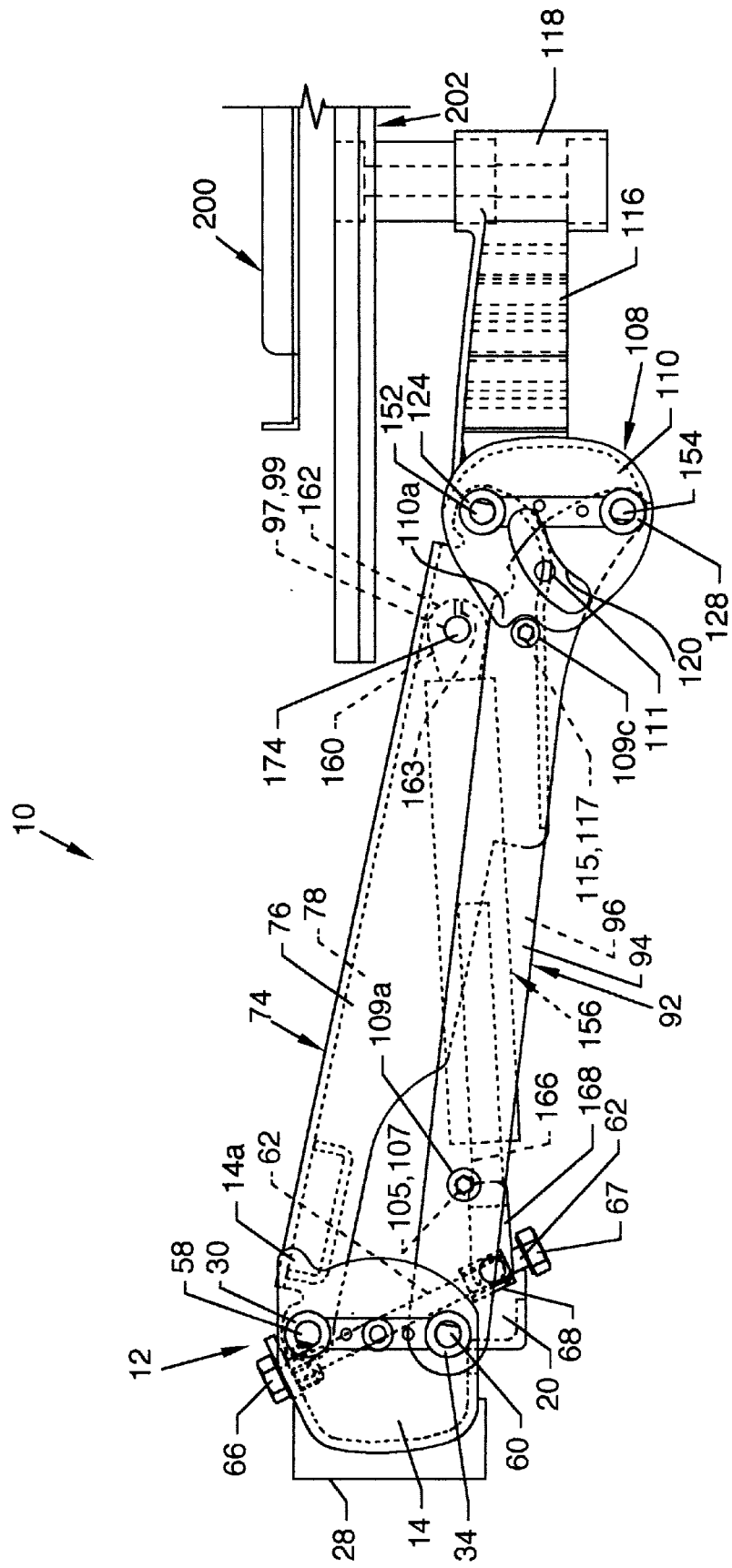
FIG. 6 illustrates a side view of the lift/suspension system configured in the lift mode where the lift/suspension system is positioned in the lowest allowable position.

FIG. 6 illustrates a side view of the lift/suspension system 10 configured in the lift mode where the lift/suspension system 10 is positioned in the lowest allowable position, where all numerals correspond to those elements previously described. Plates 42 and 136 are not illustrated for purposes of brevity and clarity. In this position downward movement of the arm lower link bracket 92, and thus the downward movement of the arm upper link bracket 74, is limited and restricted by impingement of the cap screw stops 109c and 109n (not visible) in lower threaded holes 115 and 117 (not visible) with left and right stops 110a and 114a (not visible) located on left and right sides 110 and 114 (not visible) of the arm minor bracket 108, respectively. In the lift mode, the clevis 160 secures and connects the gas spring 156 to the pin 174 located in left and right upper holes 97 and 99 at the upper region of the arm upper link bracket 74.

Figure 7:
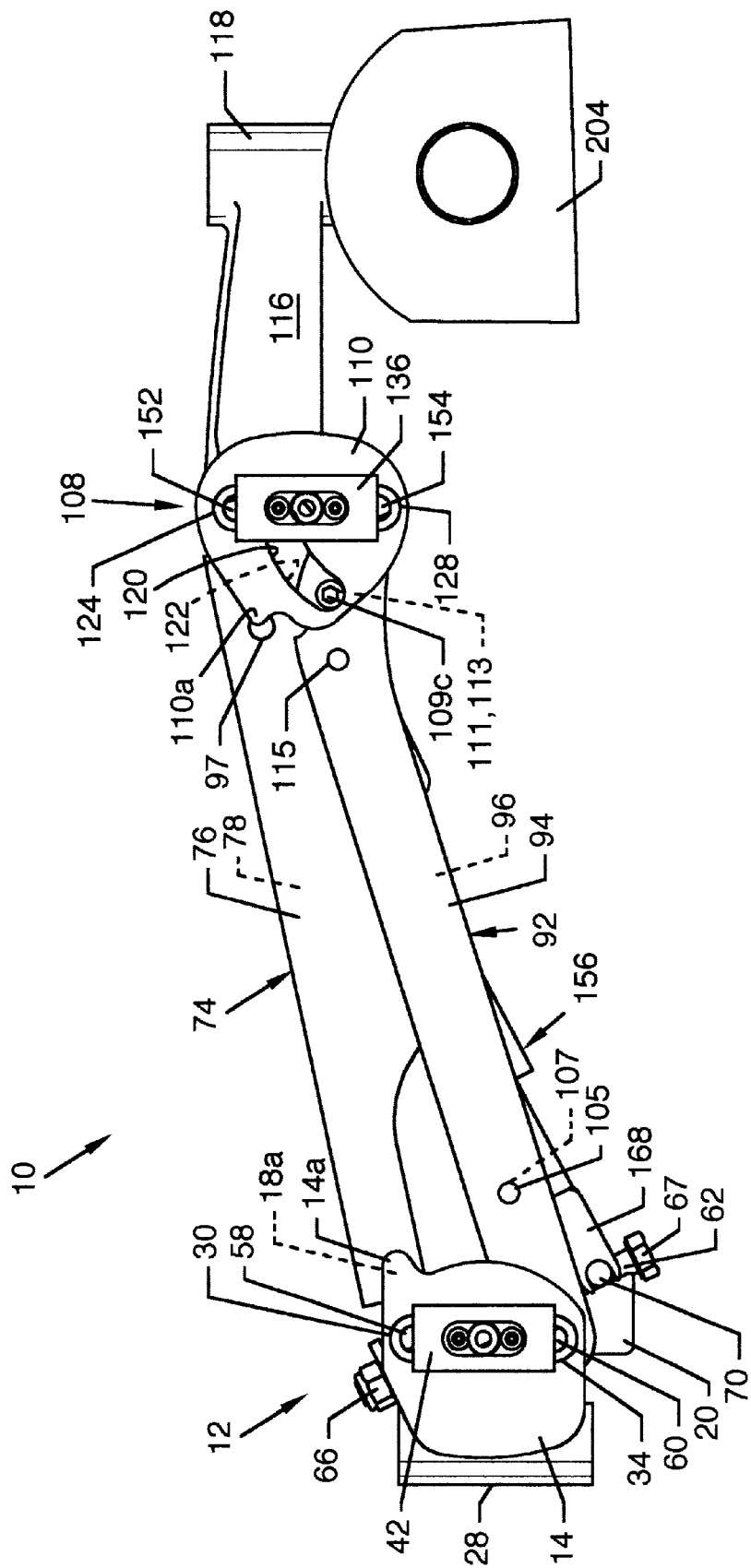
FIG. 7 illustrates a side view of the lift/suspension system configured in the suspension mode where the lift/suspension system is positioned in the highest allowable position; and, FIG. 8 illustrates a cutaway side view of the lift/suspension system configured in the suspension mode where the lift/suspension system is positioned in the lowest allowable position.

FIG. 7 illustrates a side view of the lift/suspension system 10 configured in the suspension mode where the lift/suspension system 10 is positioned in the highest allowable position, where all numerals correspond to those elements previously described. In this position upward movement of the arm lower link bracket 92, and thus the upward movement of the arm upper link bracket 74, is limited and restricted by impingement of the cap screw stops 109c and 109n (not visible), which are installed in and extend outwardly from upper threaded holes 111 and 113 (not visible), with the lower portions of arcuate slots 120 and 122 located on left and right sides 110 and 114 of the arm minor bracket 108, respectively. Cap screw stops 109a and 109b are not installed in threaded holes 105 and 107. A tilt/swivel mount 204 which can support a monitor caddy or other device is illustrated as being attached to the tube 118 at the end of the extension 116. The tilt/swivel mount 204 offers adjustment about a vertical axis and tilt adjustment about the horizontal axis. The tilt/swivel mount 204 is referred to in U.S. Pat. No. 4,453,687 entitled "Swivel/Tilt Mounting Device for a Cathode Ray Tube" held by Harry C. Sweere, the Applicant.

Figure 8:
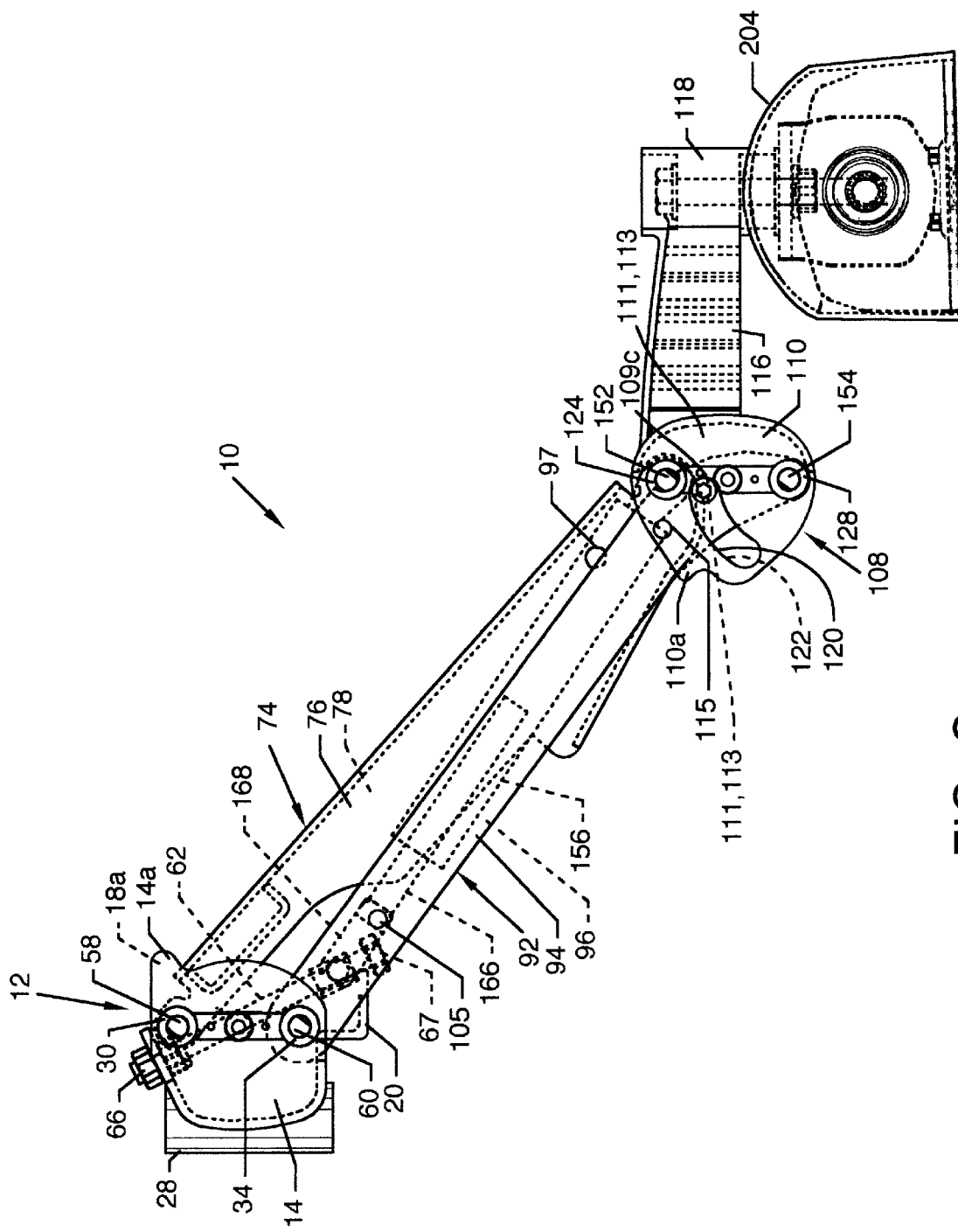

FIG. 8 illustrates a cutaway side view of the lift/suspension system 10 configured in the suspension mode where the lift/suspension system 10 is positioned in the lowest allowable position where all numerals correspond to those elements previously described. Plates 42 and 136 are not illustrated for purposes of brevity and clarity. In this position downward movement of the arm lower link bracket 92, and thus the downward movement of the arm upper link bracket 74, is limited and restricted by impingement of the cap screw stops 109c and 109n (not visible), which extend outwardly from upper threaded holes 111 and 113 (not visible), with the upper portions of arcuate slots 120 and 122 located on left and right sides 110 and 114 of the arm minor bracket 108 respectively. In the suspension mode, the clevis 160 rotatingly connects the gas spring 156 to the upper rod 152 located in left and right upper holes 124 and 126 at the upper region of the arm minor bracket 108.

Various modifications can be made to the present invention without departing from the apparent scope hereof.

What is claimed:
1. A multi-function display mounting system comprising:
   a. an arm major bracket;
   b. an arm minor bracket;
   c. an arm upper link bracket connected between said arm major bracket and said arm minor bracket;
   d. an arm lower link bracket connected between said arm major bracket and said arm minor bracket and wherein the arm lower link bracket includes means for selectively configuring the system in a suspension mode or in a lift mode;
   e. a hex bolt with a block including opposing pivot projections secured to said arm major bracket; and,
   f. a gas cylinder connected between said opposing pivot projections and said arm upper link bracket in a lift mode.
2. The system of claim 1, including a tray connected to said arm minor bracket.

3. A multi-function display mounting system comprising:
a. an arm major bracket;
b. an arm minor bracket;
c. an arm upper link bracket connected between said arm major bracket and said arm minor bracket;
d. an arm lower link bracket connected between said arm major bracket and said arm minor bracket and wherein the arm lower link bracket includes means for selectively configuring the system in a suspension mode or in a lift mode;
e. a hex bolt with a block including opposing pivot projections secured to said arm major bracket; and,
f. a gas cylinder connected between said opposing pivot projections and said arm minor bracket in a suspension mode.

4. The system of claim 3, including a tilt swivel connected to said arm minor bracket.

* * * * *